No. 670,525. Patented Mar. 26, 1901.
C. W. ARRASMITH.
FRUIT PACKING DEVICE.
(Application filed Oct. 18, 1900.)
(No Model.)

Witnesses,
E. A. Brandau
J. H. Mree

Inventor,
Charles W. Arrasmith
By Dewey Strong & Co
Attys

THE NORRIS PETERS CO., PHOTO-LITHO., WASHINGTON, D. C.

UNITED STATES PATENT OFFICE.

CHARLES W. ARRASMITH, OF COURTLAND, CALIFORNIA.

FRUIT-PACKING DEVICE.

SPECIFICATION forming part of Letters Patent No. 670,525, dated March 26, 1901.

Application filed October 18, 1900. Serial No. 33,435. (No model.)

*To all whom it may concern:*

Be it known that I, CHARLES W. ARRASMITH, a citizen of the United States, residing at Courtland, county of Sacramento, State of California, have invented an Improvement in Fruit-Packing Devices; and I hereby declare the following to be a full, clear, and exact description of the same.

My invention relates to a device for packing fresh fruits, such as cherries, berries, &c.

It consists of a framework having an opening therein in which is a concaved slidable bottom, with means for adjusting and holding the same and means for holding a fruit-receptacle inverted above and covering this opening, and of details more fully to be set forth in the following specification and accompanying drawings.

Figure 1:
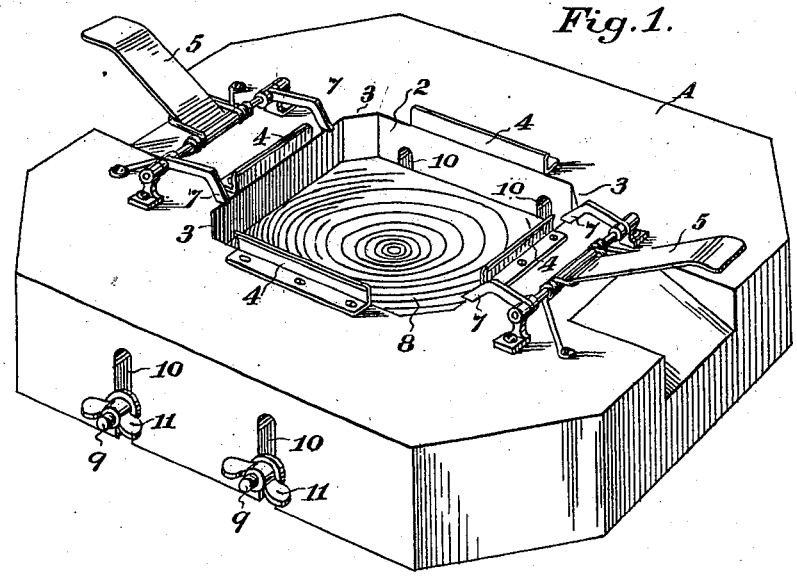
Figure 2:
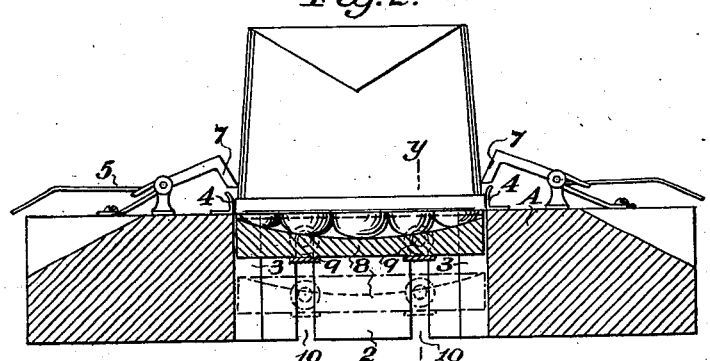
Figure 3:
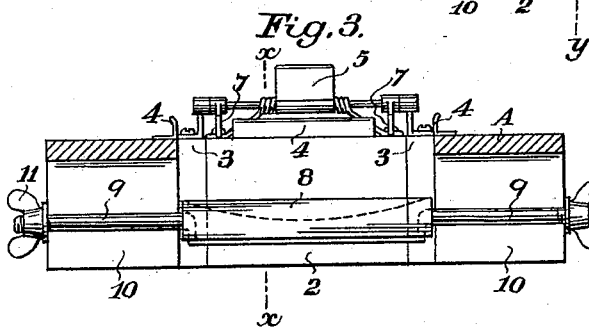
Figure 4:
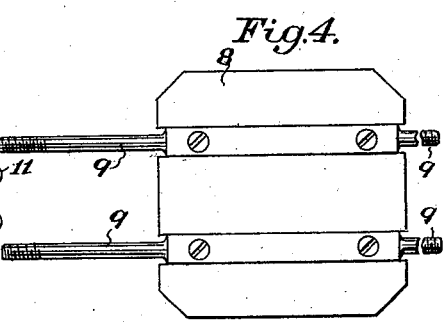

Figure 1 is a perspective view of my fruit-packing device. Fig. 2 is a longitudinal section on the line $x\ x$ of Fig. 3. Fig. 3 is a transverse section on the line $y\ y$, Fig. 2. Fig. 4 is a plan underneath of the crown-block.

The device is intended to assist in the rapid filling of baskets with readily-perishable fruits by the least possible amount of handling and not only giving a symmetrical curve to the heaped fruit in the basket, but offering a means by which this curve or "crown" may be varied in the same machine. This is of considerable importance, because it allows a quantitative variation of the same fruit in boxes of the same size; also, the packing and proper "crowning" of various fruits in the same size of box.

A represents a base or frame having an opening 2 of any shape, varying as that of the box to be filled and of corresponding size. Certain projections or points, as 3, upon the edge of this opening are left and upon which the inverted open-bottomed basket is to be supported. Guides, as 4, upon the edges of the opening 2 hold the basket in proper position, and spring-levers 5, with their hooks 7, engage the sides of the box and hold it firmly during the process of packing. In the opening 2 is a slidable bottom or block 8, having a concaved upper face, which gives the crown to the fruit. The elevation of this bottom or crown-block, or, in other words, its depression below the surface of the base A, is effected by means of the supporting or guide rods 9, movable in the transverse slots 10 and to which rods the crown-block is attached. Locking devices, such as nuts 11, upon the ends of the rods 9, bearing against the sides of the base, hold these rods and the block in any desired position. By the variation of the height of the wall of the opening 2 through the raising or lowering of the block I secure the different curves in the crown of the fruit or a difference in the amount to go in a basket, as may be desired.

Having thus described my invention, what I claim as new, and desire to secure by Letters Patent, is—

1. In a device for packing fruit, a base having an opening therein, a concaved block fitting and slidable in this opening, means by which the block is secured in position and means upon the block by which a receptacle may be held over the opening and in line with the concave block.

2. In a device for packing fruit, a base having an opening corresponding with the shape of the basket, a concaved block fitting and movable in this opening, and rods to which the block is secured, slidable in slots in the base and set-nuts upon the ends of these rods, by which the depression of the block below the surface of the base is regulated.

3. A fruit-packing device consisting of a base having an opening therein, corresponding to the shape of the basket, a concaved block slidable in this opening, rods secured to this block and whereby the position of the block in the opening is regulated, projections upon the edges of the opening upon which the basket is supported, and spring-pressed clamps upon the opposite sides of the opening to retain the basket in position while being filled.

In witness whereof I have hereunto set my hand.

CHARLES W. ARRASMITH.

Witnesses:
S. H. NOURSE,
JESSIE C. BRODIE.